United States Patent
Autio et al.

(10) Patent No.: US 11,742,698 B2
(45) Date of Patent: Aug. 29, 2023

(54) SYSTEMS AND METHODS FOR WIRELESS CHARGER DOCKING

(71) Applicant: Microsoft Technology Licensing, LLC, Redmond, WA (US)

(72) Inventors: Henri Antero Autio, Redmond, WA (US); Ibrahim Iskender Kushan, Seattle, WA (US); Carl Edward Picciotto, Clyde Hill, WA (US); Daniel Thomas Nevistic, Bellevue, WA (US); Oscar Hochun To, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 464 days.

(21) Appl. No.: 16/743,785

(22) Filed: Jan. 15, 2020

(65) Prior Publication Data

US 2021/0099014 A1 Apr. 1, 2021

Related U.S. Application Data

(60) Provisional application No. 62/908,414, filed on Sep. 30, 2019.

(51) Int. Cl.
*H02J 50/10* (2016.01)
*H04B 5/00* (2006.01)
(Continued)

(52) U.S. Cl.
CPC ............ *H02J 50/10* (2016.02); *H02J 7/02* (2013.01); *H02J 50/80* (2016.02); *H04B 5/0037* (2013.01)

(58) Field of Classification Search
CPC .. H02J 50/12; H02J 50/80; H02J 50/90; H02J 50/70; H02J 7/025; H02J 50/50; H02J 50/60; H02J 5/005; H02J 50/005; H02J 7/00034; H02J 50/40; H02J 7/0047; H02J 7/0029; H02J 50/402; H02J 7/0042; H02J 7/0044; H02J 2310/48; H02J 50/10; H02J 7/00; H02J 7/00304; H02J 50/502; H02J 7/00309; H02J 50/05; H02J 7/0013; H02J 7/0027; H02J 7/00302; H02J 50/20; H02J 7/00045; H02J 7/35; H02J 2310/40; H02J 3/322; H02J 7/00712; H02J 13/00017;
(Continued)

(56) References Cited

U.S. PATENT DOCUMENTS

| | | | |
|---|---|---|---|
| 7,352,567 B2 | 4/2008 | Hotelling et al. | |
| 9,537,353 B1* | 1/2017 | Bossetti | H02J 7/00034 |

(Continued)

OTHER PUBLICATIONS

"International Search Report and Written Opinion Issued in PCT Application No. PCT/US20/038575", dated Sep. 18, 2020, 11 Pages.
(Continued)

*Primary Examiner* — Binh C Tat
(74) *Attorney, Agent, or Firm* — RAY QUINNEY & NEBEKER P.C.; Paul N. Taylor

(57) ABSTRACT

A method of adapting the charging of an accessory device includes transmitting a first transmission signal at a first transmission amplitude, measuring a receiving load of the first transmission signal, and if the charging device does not receive a response signal to the first transmission signal, transmitting a second transmission signal at a second transmission amplitude that is different from the first transmission amplitude.

21 Claims, 5 Drawing Sheets

(51) Int. Cl.
*H02J 50/80* (2016.01)
*H02J 7/02* (2016.01)

(58) Field of Classification Search
CPC ........... H02J 13/00024; H02J 13/00026; H02J 13/0075; H02J 2207/40; H02J 7/0019; H02J 7/007; H02J 7/007194; H02J 7/02; H02J 7/34; H02J 7/00308; H02J 2310/23; H01F 38/14; H01F 2003/005; H01F 2005/027; H01F 27/38; H01F 27/34; H04B 5/0081; H04B 5/0037; H04B 5/0093; H04B 5/0087; H04B 5/0075
USPC .................................................. 320/106–115
See application file for complete search history.

(56) References Cited

U.S. PATENT DOCUMENTS

| | | | |
|---|---|---|---|
| 9,559,526 B2 | 1/2017 | Von Novak et al. | |
| 9,647,481 B2 | 5/2017 | Huang et al. | |
| 9,991,753 B2 | 6/2018 | Miller et al. | |
| 10,291,073 B2 | 5/2019 | Trudeau et al. | |
| 2008/0252254 A1 | 10/2008 | Osada | |
| 2014/0266025 A1* | 9/2014 | Jakubowski | H02J 7/0048 320/108 |
| 2016/0301263 A1 | 10/2016 | Schorpp | |
| 2017/0025896 A1 | 1/2017 | Partovi et al. | |
| 2017/0077735 A1* | 3/2017 | Leabman | H02J 50/20 |
| 2017/0110911 A1 | 4/2017 | Bossetti et al. | |
| 2017/0155270 A1 | 6/2017 | Wang | |
| 2018/0090966 A1 | 3/2018 | Grover et al. | |
| 2019/0081515 A1* | 3/2019 | Gajiwala | H01F 27/2885 |
| 2019/0207411 A1 | 7/2019 | Kim et al. | |

OTHER PUBLICATIONS

"Charging Without Wires", Retrieved From: https://web.archive.org/web/20180703033517/https:/batteryuniversity.com/index.php/learn/article/charging_without_wires, Jul. 3, 2018, 13 Pages.

"Wireless Charging—How does it Work?", Retrieved From: https://www.mockett.com/blog-2018-wireless, Jul. 12, 2018, 11 Pages.

Babikir, et al., "Design and Implementation of a Multi-Purpose Wireless Charger", In Proceedings of 5th International Conference on Electronic Devices, Systems and Applications, Dec. 6, 2016, 4 Pages.

Lu, et al., "Wireless Charging Technologies: Fundamentals, Standards, and Network Applications", In Journal of IEEE Communications Surveys & Tutorials, vol. 18, Issue 2, May 20, 2016, pp. 1413-1452.

"Office Action Issued in European Patent Application No. 20737735.9", dated Feb. 16, 2023, 3 Pages.

* cited by examiner

SYSTEMS AND METHODS FOR WIRELESS CHARGER DOCKING

CROSS-REFERENCE TO RELATED APPLICATIONS

This application claims priority to and the benefit of U.S. Provisional Patent Application No. 62/908,414, filed on Sep. 30, 2019, which is hereby incorporated by reference in its entirety.

BACKGROUND

Background and Relevant Art

Wireless electronic devices provide users improved levels of freedom while remaining connected to personal and professional communications. Wireless accessory devices allow more efficient interactions with communications and other electronic devices. However, even electronic and accessory devices intended to be used wirelessly conventionally require wired charging of an internal power supply. Wireless charging techniques are becoming more common, but exhibit lower power transmission performance, lower charging performance, slower data transmission, and other shortcomings relative to wired charging and data transfer.

BRIEF SUMMARY

In some embodiments, an accessory device is positioned proximate a wireless charging device, such as a near-field communication transmission coil. The wireless charging device provides a transmission energy that is received by the accessory device and induces an electrical current in the accessory device. Modulation of the transmission energy amplitude varies the induced current to transmit data to the accessory device. In some embodiments, a wireless charging device sets a first transmission amplitude to establish communication with the accessory device and, if the wireless charging device does not receive a recognized response from the accessory device, changes the transmission energy to a second transmission amplitude.

In some embodiments, a method of adapting the charging of an accessory device includes transmitting a first transmission signal at a first transmission amplitude, measuring a receiving load of the first transmission signal, and if the charging device does not receive a response signal to the first transmission signal, transmitting a second transmission signal at a second transmission amplitude that is different from the first transmission amplitude.

In some embodiments, a system for communicating with an accessory device wirelessly includes a transmission coil, a processor in data communication with the transmission coil, and a hardware storage device in data communication with the processor. The hardware storage device has instructions stored thereon that, when executed by a processor, cause the processor to transmit a first transmission signal at a first transmission amplitude with the transmission coil, measure a receiving load of the first transmission signal, and if the transmission coil does not receive a response signal to the first transmission signal, transmit a second transmission signal at a second transmission amplitude that is different from the first transmission amplitude.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

The present disclosure relates generally to devices, systems, and methods for docking an accessory device on a wireless charger. In some embodiments, the wireless charger is part of a dock integrated into another electronic device, such as a peripheral dock on a laptop computer. In some embodiments, the wireless charger is a dedicated dock for the accessory device, such as a charging cradle for a remote control.

In some embodiments, a user docks an accessory device on another electronic device to charge the accessory device. In some embodiments, the dock includes a transmission coil that produces a magnetic field. The magnetic field of the dock can magnetically couple the transmission coil to a receiving coil of the accessory device to induce an electric current in the receiving coil of the accessory device.

In some embodiments, a computer mouse can be docked on a wireless charging pad to charge the mouse between use sessions. In some embodiments, the accessory device is a wearable device, such as a smartwatch. In some embodiments, the accessory device is a stylus. In some embodiments, the accessory device is a keyboard. In some embodiments, the accessory device is a touch-sensitive device, such as a track pad, touchscreen, other capacitive touch-sensitive surface, other resistive touch-sensitive surface, or other touch-sensitive input mechanism. In some embodiments, the accessory device is an audio device, such as a wireless speaker, headphones, earphones, or other audio device capable of generating audio signals to communicate with a user.

In some embodiments, the electronic device is a computing device, including but not limited to a laptop computer, hybrid computer, foldable computer, tablet computer, smartphone, wearable computing device, or other computing device. In some embodiments, the electronic device includes a dock that contains a transmission coil. The transmission coil can send a transmission energy from the dock to the accessory device. When a transmission current is applied to the transmission coil in the dock, the transmission coil generates a magnetic field that extends beyond an outer surface of the dock. A receiving coil positioned within the magnetic field proximate the dock experiences the magnetic field. A varying magnetic field induces a current in the receiving coil. In some embodiments, the transmission coil produces a radio frequency (RF) signal in the near-field communication (NFC) frequency range.

In some embodiments, the transmission coil transmits energy from the transmission coil to the receiving coil to wirelessly charge and/or communicate with the accessory device. In some embodiments, the power supply is a battery. In some embodiments, the power supply is a capacitor. In some embodiments, the transmission coil modulates the transmission energy from the transmission coil to the receiving coil to communicate data from the dock and/or electronic device to the accessory device.

Figure 1:
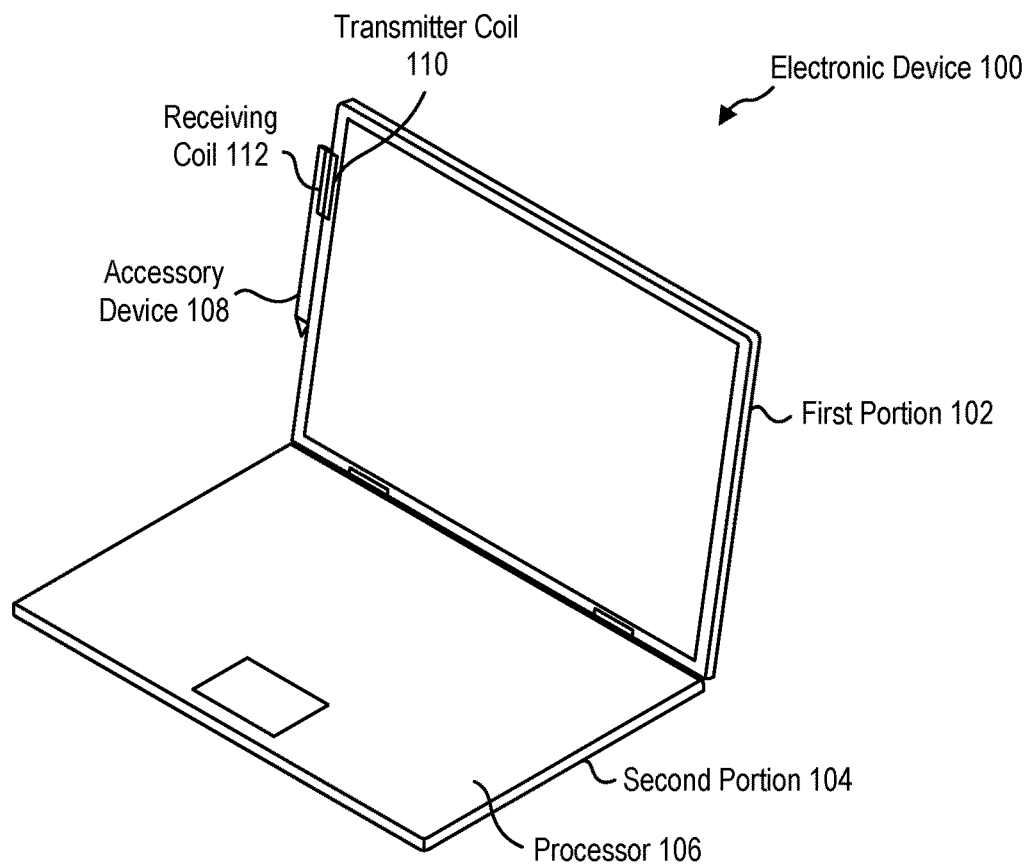
FIG. 1 is a perspective view of an electronic device with an accessory device docked thereon, according to at least one embodiment of the present disclosure.

FIG. 1 is a perspective view of an embodiment of an electronic device 100 with an accessory device 108 docked thereto. The electronic device 100 illustrated in FIG. 1 is a laptop computer having a first portion 102 and a second portion 104 that are movable relative to one another, and the accessory device 108 is a stylus that pairs with the electronic device to provide inputs and inking functionally.

In some embodiments, a processor 106 of the electronic device 100 is located in the second portion 104 and is in data communication with a transmission coil 110 located in the first portion 102. When the accessory device 108 is positioned in proximity to the transmission coil 110, a receiving coil 112 receives a transmission energy from the transmission coil 110, and the accessory device 108 enters a docked mode. In the illustrated embodiment, the bezel of the first portion 102 that contains the transmission coil 110 acts as the dock for the accessory device 108. In some embodiments, the dock includes a retention mechanism, such as a mechanical retention mechanism, a magnetic retention mechanism, or an adhesive retention mechanism, to hold the accessory device 108 in proximity to the dock. In some embodiments, the dock is oriented such that gravity holds the accessory device 108 in proximity to the dock.

Figure 2:
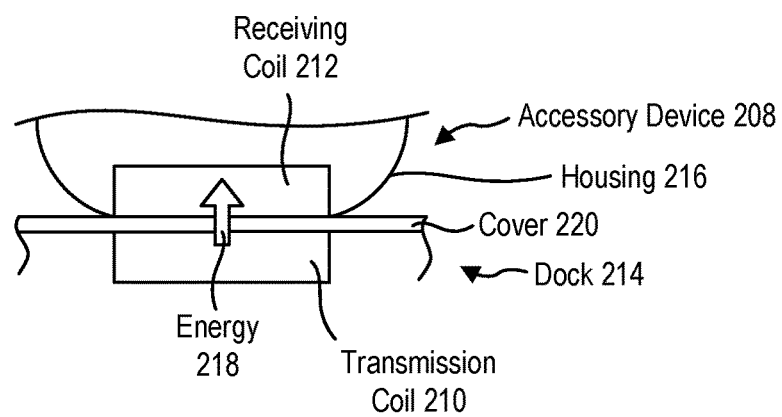
FIG. 2 is a side view of an accessory device positioned on a dock, according to at least one embodiment of the present disclosure.

FIG. 2 is a side view of another embodiment of an accessory device 208 resting on a dock 214. In some embodiments, the accessory device 208 has a housing 216, with the receiving coil 212 positioned at or near a surface of the housing 216. The receiving coil 212 is positioned proximate a transmission coil 210 of the dock 214, such that a transmission energy 218 is transmitted to the receiving coil 212.

In some embodiments, the transmission energy 218 is transmitted through one or more parts of the accessory device 208 and/or dock 214 en route to the receiving coil 212. In some embodiments, the housing 216 of the accessory device 208 and/or a cover 220 of the dock 214 are at least partly transparent to the transmission energy 218. In the illustrated embodiment with a transmission coil 210 that generates a magnetic field, the cover 220 is a non-magnetic material to allow the transmission energy 218 to pass through the cover 220 to the receiving coil 212.

Figure 3:
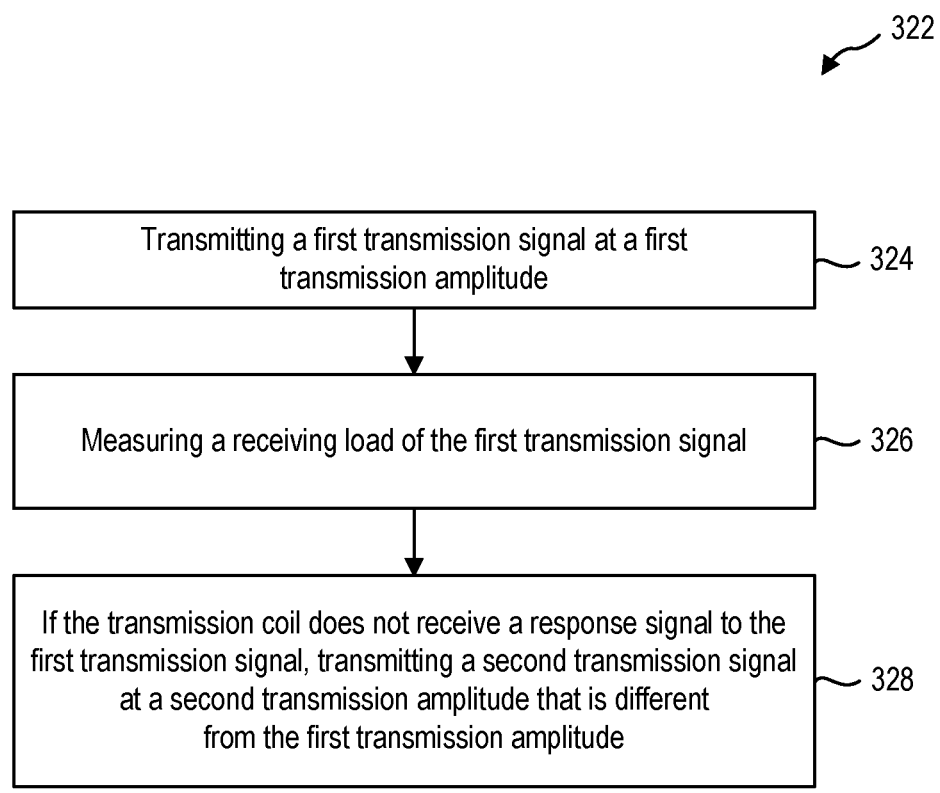
FIG. 3 is a flowchart of a method of communicating data to an accessory device with a wireless charger, according to at least one embodiment of the present disclosure.

Referring now to FIG. 3, in some embodiments, a method (322) of communicating via a wireless charging device includes transmitting (324) a first transmission signal at a first transmission amplitude with a transmission coil and measuring (326) a receiving load of the transmission signal. In some embodiments, the transmission signal is a power signal to establish communications for powering or charging an accessory device. When a metallic or otherwise ferromagnetic object is proximate the transmission coil, the first transmission signal induces a current in the object and the transmission coil experiences a receiving load. Measuring the receiving load of the transmission signal allows the wireless charging device to detect the presence of the object in proximity to the transmission coil.

In some embodiments, induction of a current through a magnetic coupling causes bouncing. Bouncing is the generation of multiple signals as an electrical contact or electrical coupling opens or closes. Debouncing detects the multiple signals and ensures that only a single signal will be acted upon for a single opening or closing of a contact. In some embodiments, the method includes debouncing a response signal from the accessory device to ensure a receiving load is measured accurately.

In some embodiments, the first transmission signal includes a modulated signal to communicate with the receiving coil of the accessory device. The transmission coil provides the modulated signal by changing the amplitude of the first transmission signal during the first transmission signal. An accessory device can receive and interpret the amplitude modulations of a first transmission signal and subsequently respond to the first transmission signal. A response from the accessory device confirms to the wireless charging device that the object in the magnetic field of the transmission coil is a chargeable accessory device and the wireless charging device can begin charging the accessory device.

In some embodiments, the first transmission signal fails to communicate with the accessory device. In some embodiments, the communication fails because of foreign object interference. In some embodiments, the communication fails because of electromagnetic interference (EMI) or radio frequency interference (RFI). In some embodiments, the communication fails because the first transmission signal is underpower. In some embodiments, the communication fails because the first transmission signal is overpower.

In some embodiments, the method includes, if the transmission coil does not receive a response signal to the first transmission signal, transmitting (328) a second transmission signal at a second transmission amplitude that is different from the first transmission amplitude.

In embodiments where the communication fails because of overpower, the first transmission signal is saturating the receiving coil. A ferromagnetic object experiences a current in the presence of a varying magnetic field. However, the current cannot increase indefinitely as the amplitude of the magnetic field increases. The ferromagnetic object will experience a current up to a saturation point. Because the magnetic field can only induce a current up to the saturation point, variation of the amplitude of the magnetic field beyond the saturation point produces no changes in the electrical current. In some embodiments, a magnetic saturation of the receiving coil prevents communication by modulation of the magnetic field.

In embodiments where the receiving coil magnetically saturates and fails to send a response signal to the transmission coil of the wireless charging device, the wireless charging device sends a second transmission signal that has a second transmission amplitude that is less than the first transmission amplitude. In some embodiments, the second transmission amplitude is a percentage of the first transmission amplitude in a range having an upper value, a lower value, or upper and lower values including any of 5%, 10%, 20%, 30%, 40%, 50%, 60%, 70%, 80%, 90%, or any values therebetween. In some embodiments, the second transmission amplitude is less than 90% of the first transmission amplitude. In some embodiments, the second transmission amplitude is less than 80% of the first transmission amplitude. In some embodiments, the second transmission amplitude is less than 60% of the first transmission amplitude. In some embodiments, the second transmission amplitude is between 5% and 80% of the first transmission amplitude. In some embodiments, the second transmission amplitude is between 10% and 60% of the first transmission amplitude.

Figure 4:
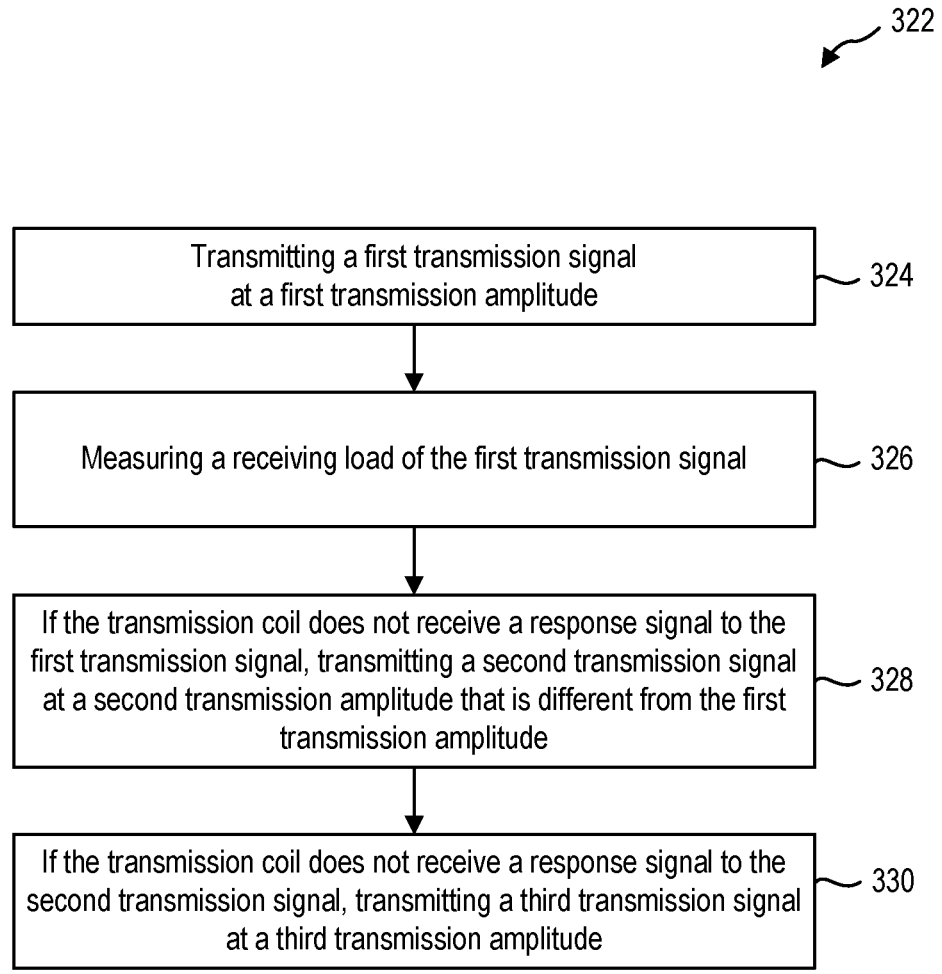
FIG. 4 is a flowchart of another method of communicating data to an accessory device with a wireless charger, according to at least one embodiment of the present disclosure.

FIG. 4 illustrates another flowchart illustrating a method of communicating using a wireless charging device. In some embodiments, the method (322) of communicating using a wireless charging device includes transmitting (324) a first transmission signal at a first transmission amplitude with a transmission coil and measuring (326) a receiving load of the transmission signal. If the transmission coil does not receive a response signal to the first transmission signal, the method further includes transmitting (328) a second transmission signal at a second transmission amplitude that is different from the first transmission amplitude. If the transmission coil does not receive a response signal to the second transmission signal, the method further includes transmitting (330) a third transmission signal at a third transmission amplitude that is different from the first transmission amplitude and the second transmission amplitude.

In embodiments where the receiving coil magnetically saturates and fails to send a response signal to the transmission coil of the wireless charging device, the wireless charging device sends a third transmission signal that has a third transmission amplitude that is less than the second transmission amplitude. In some embodiments, the third transmission amplitude is a percentage of the second transmission amplitude in a range having an upper value, a lower value, or upper and lower values including any of 5%, 10%, 20%, 30%, 40%, 50%, 60%, 70%, 80%, 90%, or any values therebetween. In some embodiments, the third transmission amplitude is less than 90% of the second transmission amplitude. In some embodiments, the third transmission amplitude is less than 80% of the second transmission amplitude. In some embodiments, the third transmission amplitude is less than 60% of the second transmission amplitude. In some embodiments, the third transmission amplitude is between 5% and 80% of the second transmission amplitude. In some embodiments, the third transmission amplitude is between 10% and 60% of the second transmission amplitude.

In some embodiments, the third transmission amplitude is a percentage of the first transmission amplitude in a range having an upper value, a lower value, or upper and lower values including any of 5%, 10%, 20%, 30%, 40%, 50%, 60%, 70%, 80%, or any values therebetween. In some embodiments, the third transmission amplitude is less than 80% of the first transmission amplitude. In some embodiments, the third transmission amplitude is less than 70% of the first transmission amplitude. In some embodiments, the third transmission amplitude is less than 60% of the first transmission amplitude. In some embodiments, the third transmission amplitude is between 5% and 80% of the first transmission amplitude. In some embodiments, the third transmission amplitude is between 10% and 60% of the first transmission amplitude.

Figure 5:
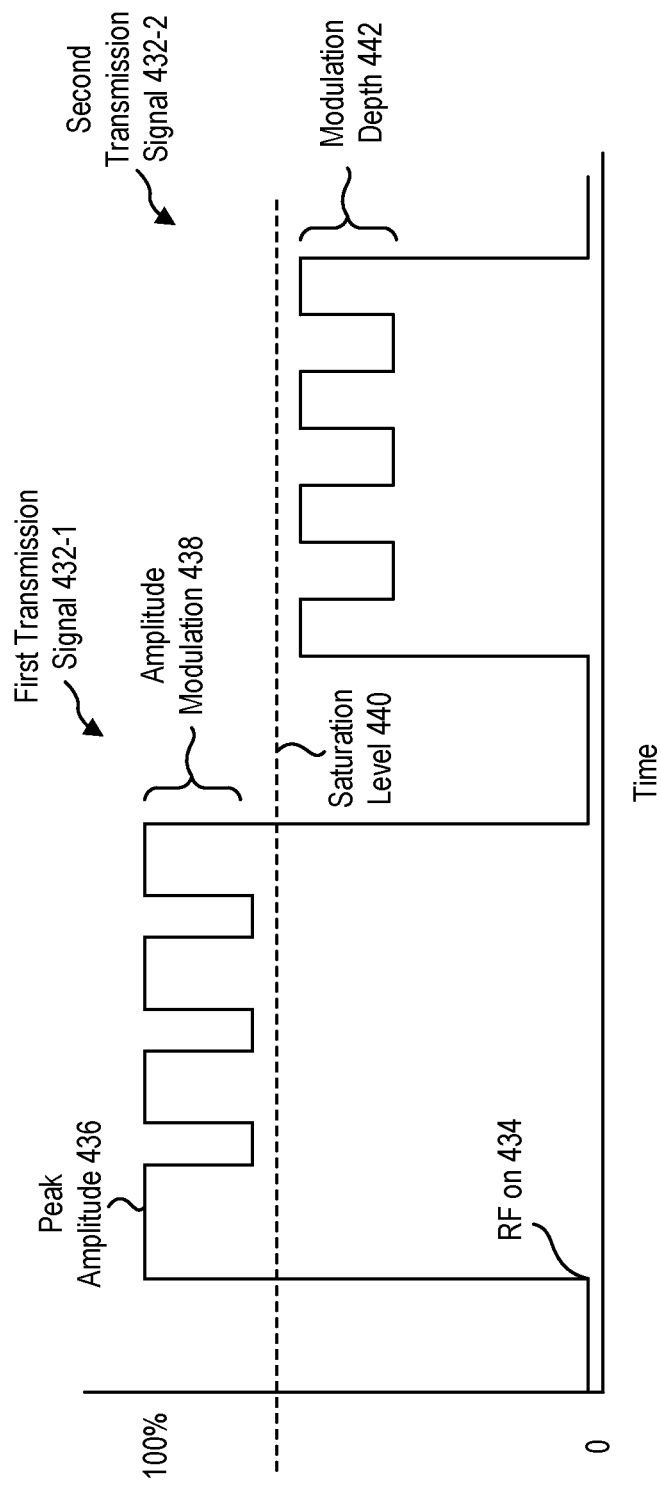
FIG. 5 is a graph illustrating transmitting transmission signals with different amplitudes and modulation depths, according to at least one embodiment of the present disclosure.

In some embodiments, the modulation of the transmission signal is relative to a peak transmission amplitude. FIG. 5 illustrates an example transmission signal 432. A first transmission signal 432-1 begins when the RF (e.g., magnetic) field is turned on at 434 and has a peak amplitude 436. In some embodiments, the amplitude has an amplitude modulation 438 down to 90%, 80%, 70%, 60% of the peak amplitude 436, or any values therebetween. The modulation depth is the amount of current variation that is induced in the receiving coil of the accessory device. If the amplitude modulation occurs above the saturation level 440 of the receiving coil, there is no modulation depth and the amplitude modulation 438 produces little or no change in the induced current.

In some embodiments, the modulation depth to communication data to through the wireless charging device is less than 90% (e.g., the low points of the transmission signal are 90% of the peak amplitude). In some embodiments, the modulation depth to communication data to through the wireless charging device is less than 80%. In some embodiments, the modulation depth to communication data to through the wireless charging device is less than 60%.

In some embodiments, the peak amplitude 436 and/or modulation 438 is above a saturation level 440 of the receiving coil. In some embodiments, the wireless charging device reduces the transmission amplitude to below the saturation level 440 of the receiving coil, such that the amplitude modulation of a second transmission signal 432-2 generates a modulation depth 442 less than a modulation threshold set in the system. In some embodiments, the modulation depth is detected by measuring the receiving load. Because the receiving load is related to the receiving coil response to the magnetic field, a stronger magnetic field produces an associated increase in the receiving load. In some embodiments, an increase in the transmission amplitude without an increase in receiving load indicates saturation of the receiving coil.

Figure 6:
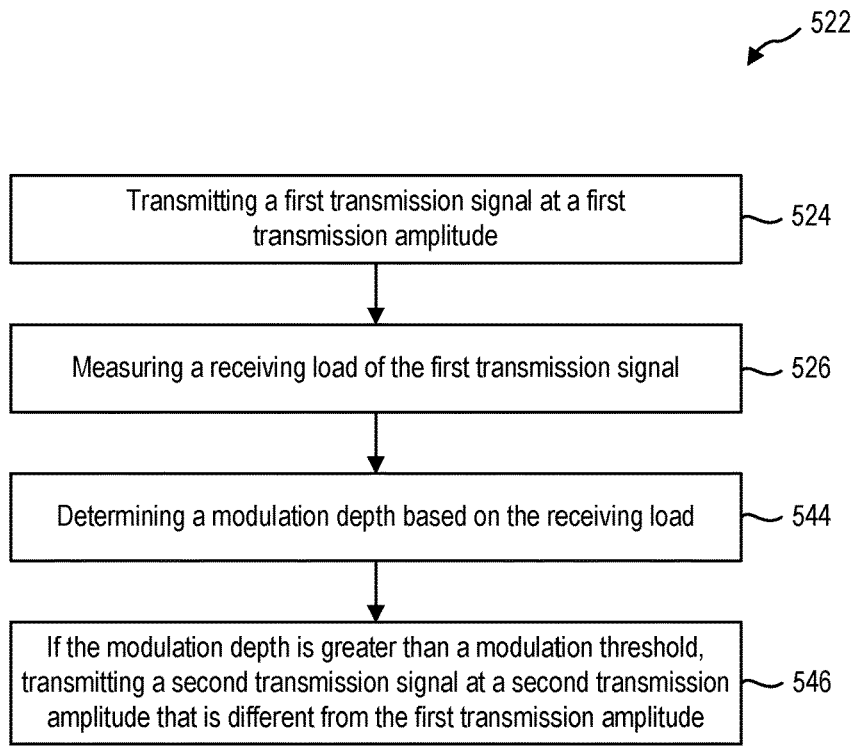
FIG. 6 is a flowchart of yet another method of communicating data to an accessory device with a wireless charger, according to at least one embodiment of the present disclosure.

FIG. 6 is a flowchart illustrating another embodiment of a method according to the present disclosure. In some embodiments, another method (522) of communicating using a wireless charging device includes transmitting (524) a first transmission signal at a first transmission amplitude with a transmission coil and measuring (526) a receiving load of the transmission signal. The method further includes determining (544) a modulation depth based on the receiving load. If the modulation depth is greater than a modulation threshold, the method includes transmitting (546) a second transmission signal at a second transmission amplitude that is different from the first transmission amplitude.

For example, if the modulation threshold is set at 80%, and the modulation depth is determined to be 90%, the method includes transmitting a second transmission signal at a second amplitude.

In some embodiments, the second transmission amplitude is a percentage of the first transmission amplitude in a range having an upper value, a lower value, or upper and lower values including any of 5%, 10%, 20%, 30%, 40%, 50%, 60%, 70%, 80%, 90%, or any values therebetween. In some embodiments, the second transmission amplitude is less than 90% of the first transmission amplitude. In some embodiments, the second transmission amplitude is less than 80% of the first transmission amplitude. In some embodiments, the second transmission amplitude is less than 60% of the first transmission amplitude. In some embodiments, the second transmission amplitude is between 5% and 80% of the first transmission amplitude. In some embodiments, the second transmission amplitude is between 10% and 60% of the first transmission amplitude.

In some embodiments, the second transmission amplitude is less than the first transmission amplitude by the same amount at the modulation threshold. For example, if the modulation threshold is 80%, the second transmission amplitude is 80% of the first transmission amplitude.

Figure 7:
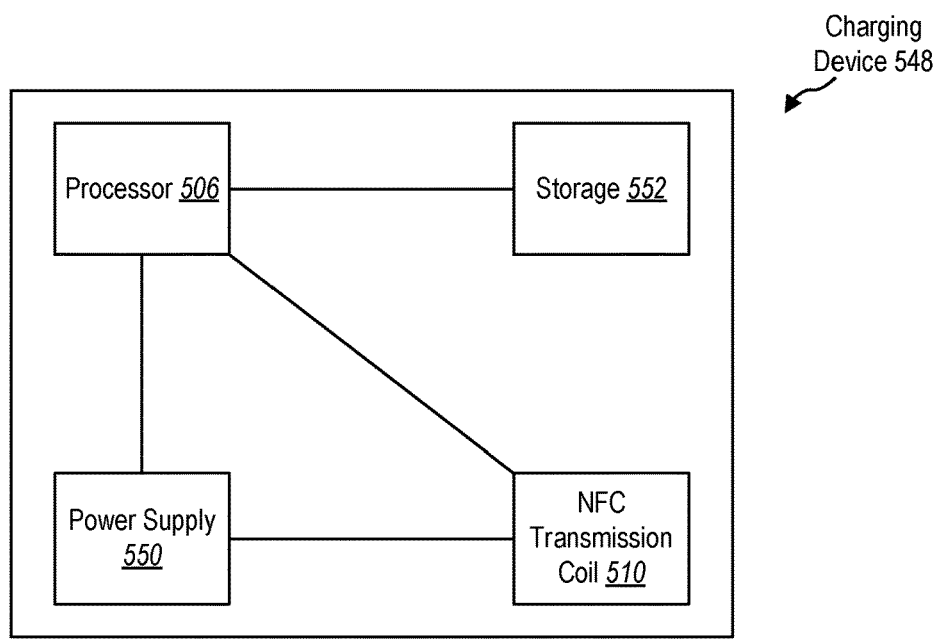
FIG. 7 is a system diagram of a charging device, according to at least one embodiment of the present disclosure.

In some embodiments, such as illustrated in FIG. 7, the wireless charging device 548 includes a processor 506 (such as the processor 106 in the electronic device 100 of FIG. 1) in data communication with a power supply 550 and a transmission coil 510 (such as the transmission coil 110 of FIG. 1 or other charging component that provides a charging energy to the accessory device). In some embodiments, the electronic device 100 is, or includes, the wireless charging device 548. The charging device 548 further includes a hardware storage device 552 in data communication with the processor 506. In some embodiments, the hardware storage device includes instructions stored thereon that, when executed by the processor, cause the processor to perform any of the methods described herein. In some embodiments, the hardware storage device is a solid-state hardware storage device. In some embodiments, the hardware storage device is a platen-based storage device. In some embodiments, the hardware storage device is an optical disk drive.

INDUSTRIAL APPLICABILITY

The present disclosure relates generally to systems and methods for docking an accessory device on a wireless charger. In some embodiments, the wireless charger is part of a dock integrated into another electronic device, such as a peripheral dock on a laptop computer. In some embodiments, the wireless charger is a dedicated dock for the accessory device, such as a charging cradle for a remote control.

In some embodiments, a user docks an accessory device on another electronic device to charge the accessory device. In some embodiments, the dock includes a transmission coil that produces a magnetic field. The magnetic field of the dock can magnetically couple the transmission coil to a receiving coil of the accessory device to induce an electric current in the receiving coil of the accessory device.

In some embodiments, a computer mouse can be docked on a wireless charging pad to charge the mouse between use sessions. In some embodiments, the accessory device is a wearable device, such as a smartwatch. In some embodiments, the accessory device is a stylus. In some embodiments, the accessory device is a keyboard. In some embodiments, the accessory device is a touch-sensitive device, such as a track pad, touchscreen, other capacitive touch-sensitive surface, other resistive touch-sensitive surface, or other touch-sensitive input mechanism. In some embodiments, the accessory device is an audio device, such as a wireless speaker, headphones, earphones, or other audio device capable of generating audio signals to communicate with a user.

In some embodiments, the electronic device is a computing device, including but not limited to a laptop computer, hybrid computer, foldable computer, tablet computer, smartphone, wearable computing device, or other computing device. In some embodiments, the electronic device includes a dock that contains a transmission coil. The transmission coil can send a transmission energy from the dock to the accessory device. When a transmission current is applied to the transmission coil in the dock, the transmission coil generates a magnetic field that extends beyond an outer surface of the dock. A receiving coil positioned within the magnetic field proximate the dock experiences the magnetic field. A varying magnetic field induces a current in the receiving coil. In some embodiments, the transmission coil produces a RF signal in the near-field communication (NFC) frequency range.

In some embodiments, the transmission coil transmits energy from the transmission coil to the receiving coil to wirelessly charge and/or communicate with the accessory device. In some embodiments, the power supply is a battery. In some embodiments, the power supply is a capacitor. In some embodiments, the transmission coil modulates the transmission energy from the transmission coil to the receiving coil to communicate data from the dock and/or electronic device to the accessory device.

In some embodiments, a method of communicating via a wireless charging device includes transmitting a first transmission signal at a first transmission amplitude with a transmission coil and measuring a receiving load of the transmission signal. When a metallic or otherwise ferromagnetic object is proximate the transmission coil, the first transmission signal induces a current in the object and the transmission coil experiences a receiving load. Measuring the receiving load of the transmission signal allows the wireless charging device to detect the presence of the object in proximity to the transmission coil.

In some embodiments, induction of a current through a magnetic coupling causes bouncing. Bouncing is the generation of multiple signals as an electrical contact or electrical coupling opens or closes. Debouncing detects the multiple signals and ensures that only a single signal will be acted upon for a single opening or closing of a contact. In some embodiments, the method includes debouncing a response signal from the accessory device to ensure a receiving load is measured accurately.

In some embodiments, the first transmission signal includes a modulated signal to communicate with the receiving coil of the accessory device. The transmission coil provides the modulated signal by changing the amplitude of the first transmission signal during the first transmission signal. An accessory device can receive and interpret the amplitude modulations of a first transmission signal and subsequently respond to the first transmission signal. A response from the accessory device confirms to the wireless charging device that the object in the magnetic field of the transmission coil is a chargeable accessory device and the wireless charging device can begin charging the accessory device.

In some embodiments, the first transmission signal fails to communicate with the accessory device. In some embodiments, the communication fails because of foreign object interference. In some embodiments, the communication fails because of electromagnetic interference (EMI) or radio frequency interference (RFI). In some embodiments, the communication fails because the first transmission signal is underpower. In some embodiments, the communication fails because the first transmission signal is overpower.

In some embodiments, the method includes, if the transmission coil does not receive a response signal to the first transmission signal, transmitting a second transmission signal at a second transmission amplitude that is different from the first transmission amplitude.

In embodiments where the communication fails because of overpower, the first transmission signal is saturating the receiving coil. A ferromagnetic object experiences a current in the presence of a varying magnetic field. However, the current cannot increase indefinitely as the amplitude of the magnetic field increases. The ferromagnetic object will experience a current up to a saturation point. Because the magnetic field can only induce a current up to the saturation point, variation of the amplitude of the magnetic field beyond the saturation point produces no changes in the electrical current. In some embodiments, a magnetic saturation of the receiving coil prevents communication by modulation of the magnetic field.

In embodiments where the receiving coil magnetically saturates and fails to send a response signal to the transmission coil of the wireless charging device, the wireless charging device sends a second transmission signal that has a second transmission amplitude that is less than the first transmission amplitude. In some embodiments, the second transmission amplitude is a percentage of the first transmission amplitude in a range having an upper value, a lower value, or upper and lower values including any of 5%, 10%, 20%, 30%, 40%, 50%, 60%, 70%, 80%, 90%, or any values therebetween. In some embodiments, the second transmission amplitude is less than 90% of the first transmission amplitude. In some embodiments, the second transmission amplitude is less than 80% of the first transmission amplitude. In some embodiments, the second transmission amplitude is less than 60% of the first transmission amplitude. In some embodiments, the second transmission amplitude is between 5% and 80% of the first transmission amplitude. In some embodiments, the second transmission amplitude is between 10% and 60% of the first transmission amplitude.

In some embodiments, another method of communicating using a wireless charging device includes transmitting a first transmission signal at a first transmission amplitude with a transmission coil and measuring a receiving load of the transmission signal. If the transmission coil does not receive a response signal to the first transmission signal, the method further includes transmitting a second transmission signal at a second transmission amplitude that is different from the first transmission amplitude. If the transmission coil does not receive a response signal to the second transmission signal, the method further includes transmitting a third transmission signal at a third transmission amplitude that is different from the first transmission amplitude and the second transmission amplitude.

In embodiments where the receiving coil magnetically saturates and fails to send a response signal to the transmission coil of the wireless charging device, the wireless charging device sends a third transmission signal that has a third transmission amplitude that is less than the second transmission amplitude. In some embodiments, the third transmission amplitude is a percentage of the second transmission amplitude in a range having an upper value, a lower value, or upper and lower values including any of 5%, 10%, 20%, 30%, 40%, 50%, 60%, 70%, 80%, 90%, or any values therebetween. In some embodiments, the third transmission amplitude is less than 90% of the second transmission amplitude. In some embodiments, the third transmission amplitude is less than 80% of the second transmission amplitude. In some embodiments, the third transmission amplitude is less than 60% of the second transmission amplitude. In some embodiments, the third transmission amplitude is between 5% and 80% of the second transmission amplitude. In some embodiments, the third transmission amplitude is between 10% and 60% of the second transmission amplitude.

In some embodiments, the third transmission amplitude is a percentage of the first transmission amplitude in a range having an upper value, a lower value, or upper and lower values including any of 5%, 10%, 20%, 30%, 40%, 50%, 60%, 70%, 80%, or any values therebetween. In some embodiments, the third transmission amplitude is less than 80% of the first transmission amplitude. In some embodiments, the third transmission amplitude is less than 70% of the first transmission amplitude. In some embodiments, the third transmission amplitude is less than 60% of the first transmission amplitude. In some embodiments, the third transmission amplitude is between 5% and 80% of the first transmission amplitude. In some embodiments, the third transmission amplitude is between 10% and 60% of the first transmission amplitude.

In some embodiments, the modulation of the transmission signal is relative to a peak transmission amplitude. In some embodiments, the amplitude is modulated by 10%, 20%, 30%, 40%, or any values therebetween. The modulation depth is the amount of variation that is induced in the receiving coil of the accessory device. In some embodiments, the modulation depth to communication data to through the wireless charging device is less than 90% (e.g., the low points of the transmission signal are 90% of the peak amplitude). In some embodiments, the modulation depth to communication data to through the wireless charging device is less than 80%. In some embodiments, the modulation depth to communication data to through the wireless charging device is less than 60%.

In some embodiments, the wireless charging device reduces the transmission amplitude to below a saturation level of the receiving coil, such that the amplitude modulation of the transmission signal generates a modulation depth less than a modulation threshold set in the system. In some embodiments, the modulation depth is detected by measuring the receiving load. Because the receiving load is related to the receiving coil response to the magnetic field, a stronger magnetic field produces an associated increase in the receiving load. In some embodiments, an increase in the transmission amplitude without an increase in receiving load indicates saturation of the receiving coil.

In some embodiments, another method of communicating using a wireless charging device includes transmitting a first transmission signal at a first transmission amplitude with a transmission coil and measuring a receiving load of the transmission signal. The method further includes determining a modulation depth based on the receiving load. If the modulation depth is greater than a modulation threshold, transmitting a second transmission signal at a second transmission amplitude that is different from the first transmission amplitude. For example, if the modulation threshold is set at 80%, and the modulation depth is determined to be 90%, the method includes transmitting a second transmission signal at a second amplitude.

In some embodiments, the second transmission amplitude is a percentage of the first transmission amplitude in a range having an upper value, a lower value, or upper and lower values including any of 5%, 10%, 20%, 30%, 40%, 50%, 60%, 70%, 80%, 90%, or any values therebetween. In some embodiments, the second transmission amplitude is less than 90% of the first transmission amplitude. In some embodiments, the second transmission amplitude is less than 80% of the first transmission amplitude. In some embodiments, the second transmission amplitude is less than 60% of the first transmission amplitude. In some embodiments, the second transmission amplitude is between 5% and 80% of the first transmission amplitude. In some embodiments, the second transmission amplitude is between 10% and 60% of the first transmission amplitude.

In some embodiments, the second transmission amplitude is less than the first transmission amplitude by the same amount at the modulation threshold. For example, if the modulation threshold is 80%, the second transmission amplitude is 80% of the first transmission amplitude.

In some embodiments, the wireless charging device includes a processor in data communication with a power supply and a transmission coil. The charging device further includes a hardware storage device in data communication with the processor. In some embodiments, the hardware storage device includes instructions stored thereon that, when executed by the processor, cause the processor to perform any of the methods described herein. In some embodiments, the hardware storage device is a solid-state hardware storage device. In some embodiments, the hardware storage device is a platen-based storage device. In some embodiments, the hardware storage device is an optical disk drive.

The present disclosure relates to systems and methods for adapting the charging of an accessory device via a wireless charging device according to at least the examples provided in the sections below:

1. A method of adapting the charging of an accessory device (e.g., accessory device 108), the method comprising:
    at a charging device (e.g., electronic device 100):
        transmitting (e.g., via NFC transmission coil 510) a first transmission signal (e.g., transmission signal 432-1) at a first transmission amplitude (e.g., peak amplitude 436);
        measuring (e.g., via the power supply 550) a receiving load of the first power signal;
        determining based on the measured receiving load whether a response signal is received from the accessory device; and
        if the charging device does not receive the response signal, transmitting (e.g., via NFC transmission coil 510) a second transmission signal (e.g., transmission signal 432-2) at a second transmission amplitude that is different from the first transmission amplitude that is lower than the first transmission amplitude so as to reduce potential magnetic saturation.
2. The method of any preceding section further comprising debouncing the response signal at the transmission coil.
3. The method of any preceding section, wherein:
    determining based on the measured receiving load whether a response signal is received from the accessory device includes determining a modulation depth based on the receiving load, and
    if the modulation depth is greater than a modulation threshold, transmitting a second power signal at a second transmission amplitude that is less than the first transmission amplitude.
4. The method of section 3, wherein the second transmission amplitude is at least twice the determined modulation depth.
5. The method of any preceding section, wherein the second transmission amplitude is less than 75% of the first transmission amplitude.
6. The method of any preceding section further comprising if the transmission coil does not receive a response signal to the second transmission signal, transmitting a third power signal at a third transmission amplitude.
7. The method of section 6, wherein the third transmission amplitude is less than 75% of the second transmission amplitude.
8. The method of any preceding section, wherein:
    determining based on the measured receiving load whether a response signal is received from the accessory device includes determining whether the receiving load indicates the receiving coil is saturated.
9. A method of adapting the charging of an accessory device (e.g., accessory device 108), the method comprising:
    at a charging device (e.g., electronic device 100:
        transmitting (e.g., via NFC transmission coil 510) a first power signal (e.g., transmission signal 432-1) at a first transmission amplitude (e.g., peak amplitude 436);
        measuring (e.g., via the power supply 550) a receiving load of the first power signal;
        determining a modulation depth (e.g., modulation 438) based on the receiving load; and
        if the modulation depth is greater than a modulation threshold, transmitting a second power signal (e.g., transmission signal 432-2) at a second transmission amplitude that is different from the first transmission amplitude.
10. The method of section 9, wherein the modulation threshold is 90%.
11. The method of sections 9 or 10, wherein the second transmission amplitude is less than 75% of the first transmission amplitude.
12. The method of any of sections 9-11, wherein the second transmission amplitude is at least twice an amplitude difference of determined modulation depth.
13. The method of section 12, wherein the second transmission amplitude is less than the first transmission amplitude by an amount equal to at least the modulation threshold.
14. The method of any of sections 9-13 further comprising if the modulation depth is greater than the modulation threshold, transmitting charging energy from the transmission coil.
15. A non-transitory computer readable medium having instructions stored thereon that, when executed by a processor, cause the processor to perform any of the methods of sections 1-14.
16. A system for communicating with an accessory device (e.g., accessory device 108 wirelessly, the system comprising:
    a transmission coil (e.g., NFC Transmission coil 510);
    a processor (e.g., processor 506) in data communication with the transmission coil;
    a hardware storage device (e.g., storage 552) in data communication with the processor, the hardware storage device having instructions stored thereon that, when executed by a processor, cause the system to:
transmit a first power signal with a first transmission amplitude with the transmission coil;
measure a receiving load of the first transmission signal;
determine based on the measured receiving load whether a response signal is received from the accessory device; and
if the transmission coil does not receive the response signal, transmit a second power signal at a second transmission amplitude that is different from the first transmission amplitude.

17. The system of section 16, wherein the transmission coil is a near-field communication coil.

18. The system of sections 16 or 17, the instructions further comprising wherein the second transmission amplitude is less than 75% of the first transmission amplitude.

19. The system of any of sections 16-18, the instructions further comprising determining a modulation depth of the first power signal.

20. The system of claim 16, further comprising comparing the modulation depth to a modulation threshold and transmitting the second power signal if the modulation depth is greater than the modulation threshold.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of adapting charging for an accessory device, the method comprising:
at a charging device:
transmitting a first power signal with a first transmission amplitude;
measuring a receiving load of the first power signal;
determining based on the measured receiving load whether a response signal is received from the accessory device; and
if the charging device does not receive the response signal, transmitting a second power signal at a second transmission amplitude that is lower than the first transmission amplitude so as to reduce potential magnetic saturation.

2. The method of claim 1 further comprising debouncing the response signal at the transmission coil.

3. The method of claim 1, wherein:
determining based on the measured receiving load whether a response signal is received from the accessory device includes determining a modulation depth based on the receiving load, and
if the modulation depth is greater than a modulation threshold, transmitting a second power signal at a second transmission amplitude that is less than the first transmission amplitude.

4. The method of claim 3, wherein the second transmission amplitude is at least twice the determined modulation depth.

5. The method of claim 1, wherein the second transmission amplitude is less than 75% of the first transmission amplitude.

6. The method of claim 1 further comprising if the transmission coil does not receive a response signal to the second transmission signal, transmitting a third power signal at a third transmission amplitude.

7. The method of claim 6, wherein the third transmission amplitude is less than 75% of the second transmission amplitude.

8. The method of claim 1, wherein:
determining based on the measured receiving load whether a response signal is received from the accessory device includes determining whether the receiving load indicates the receiving coil is saturated.

9. The method of claim 3, wherein one or more of the first power signal and the second power signal are wireless power signals.

10. A method of adapting the charging of an accessory device, the method comprising:
at a charging device:
transmitting a first power signal at a first transmission amplitude;
measuring a receiving load of the first power signal;
determining a modulation depth based on the receiving load; and
if the modulation depth is greater than a modulation threshold, transmitting a second power signal at a second transmission amplitude that is less than the first transmission amplitude, wherein one or more of the first power signal and the second power signal are wireless power signals.

11. The method of claim 10, wherein the modulation threshold is 90% of the first transmission amplitude.

12. The method of claim 10, wherein the second transmission amplitude is less than 75% of the first transmission amplitude.

13. The method of claim 10 wherein the second transmission amplitude is at least twice the determined modulation depth.

14. The method of claim 13, wherein the second transmission amplitude is less than the first transmission amplitude by an amount equal to at least the modulation threshold.

15. The method of claim 10 further comprising if the modulation depth is greater than the modulation threshold, transmitting a charging energy from a transmission coil.

16. The method of claim 10 further comprising:
measuring a second receiving load of the second power signal;
determining a second modulation depth based on the second receiving load; and
if the second modulation depth is greater than a modulation threshold, transmitting a third power signal at a third transmission amplitude that is less than the second transmission amplitude.

17. A system for charging an accessory device wirelessly, the system comprising:
a transmission coil;
a processor in data communication with the transmission coil;
a hardware storage device in data communication with the processor, the hardware storage device having instructions stored thereon that, when executed by a processor, cause the system to:
transmit a first power signal with a first transmission amplitude with the transmission coil;
measure a receiving load of the first transmission signal;
determine based on the measured receiving load whether a response signal is received from the accessory device; and
if the transmission coil does not receive the response signal, transmit a second power signal at a second transmission amplitude that is different from the first transmission amplitude.

18. The system of claim 17, wherein the transmission coil is a near-field communication coil.

19. The system of claim 17, the instructions further comprising wherein the second transmission amplitude is less than 75% of the first transmission amplitude.

20. The system of claim 17, the instructions further comprising determining a modulation depth of the first transmission signal.

21. The system of claim 17, further comprising comparing a modulation depth to a modulation threshold and transmitting the second transmission signal if the modulation depth is greater than the modulation threshold.

* * * * *